Nov. 2, 1965 E. C. DOWLING 3,215,994
LOGIC SYSTEM EMPLOYING MULTIPATH MAGNETIC CORES
Filed June 8, 1962 4 Sheets-Sheet 1

INVENTOR.
EDWARD C. DOWLING
BY
Curtis, Morris & Safford

LOGIC SYSTEM EMPLOYING MULTIPATH MAGNETIC CORES

Filed June 8, 1962 4 Sheets-Sheet 2

ADVANCE WINDINGS

PRIME WINDINGS

COUPLING LOOP

INVENTOR.
EDWARD C. DOWLING
BY
Curtis, Morris & Safford

Nov. 2, 1965 E. C. DOWLING 3,215,994

LOGIC SYSTEM EMPLOYING MULTIPATH MAGNETIC CORES

Filed June 8, 1962 4 Sheets-Sheet 3

INVENTOR.
EDWARD C. DOWLING

BY

Curtis, Morris & Safford

INVENTOR.
EDWARD C. DOWLING
BY
Curtis, Morris & Safford 3,215,994
Patented Nov. 2, 1965

3,215,994

LOGIC SYSTEM EMPLOYING MULTIPATH MAGNETIC CORES

Edward C. Dowling, Harrisburg, Pa., assignor to AMP Incorporated, Harrisburg, Pa.

Filed June 8, 1962, Ser. No. 200,983
14 Claims. (Cl. 340—174)

This invention relates to logic systems employing multipath magnetic cores, and more particularly to a control system for transferring intelligence into, out of and between multipath magnetic cores.

Shift registers comprised of multipath magnetic cores coupled and driven to provide temporary storage and manipulation of intelligence are generally known; one example being described in U.S. Patent No. 2,995,731 to Joseph P. Sweeney. With such devices it is possible to obtain a controlled shifting of intelligence from core-to-core by the provision of an advance or clearing magnetomotive force (M.M.F.) in conjunction with the synchronized application of a priming M.M.F. localized about a transmitting aperture. By the provision of auxiliary input and output windings on a receiving aperture of each core it is possible to obtain a serial or parallel input or output. In shifting, storage, serial or parallel read-in or read-out, with devices heretofore known, however, the input, output advance and priming pulses must all be carefully synchronized by the provision of auxiliary circuits which, unfortunately, are frequently larger, more expensive and less reliable than the shift register itself. In addition to the complexity of such auxiliary circuits, present practice utilizes separate pulse sources supplied by separate advance or prime drivers individually wired to control individual cores and all related and timed to the basic clock cycle of the device.

As a result of the foregoing many useful logic applications have not been feasible or even possible with known magnetic core devices utilizing existing gating techniques. As a further result of such shortcomings, the considerable advantages inherent in magnetic core operation as compared with that of other solid state devices have not been adequately developed.

Accordingly, it is one object of the present invention to provide an improved multipath magnetic device data control system.

It is another object of invention to provide a magnetic core system capable of shifting intelligence in a number of selected paths under the control of a single self-clocking prime steering circuit.

It is yet another object to provide a magnetic core system employing a single drive circuit for a number of shift registers.

It is still another object to provide a novel prime steering device for magnetic core circuits.

It is a further object of invention to provide a magnetic core shift register capable of a free running storage and transfer of intelligence.

It is a still further object of invention to provide a simple and inexpensive control circuit permitting static and/or dynamic serial or parallel intelligence transfer from magnetic core registers.

It is yet a further object of the invention to provide a magnetic core system capable of multiple modes of intelligence transfer.

It is another object to provide a diodeless multipath core matrix capable of being driven in a number of controlled modes by a low power, low grade signal source.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are attained by the use of a novel prime steering circuit automatically synchronized by the basic clock pulses employed to shift data in a shift register. The prime steering circuit is arranged to supply priming pulses appropriately timed to assure a transfer of data from core-to-core in either a first or Normal mode or in a second of Off-normal mode, dependent upon the presence or absence of a single trigger pulse. By the selective wiring of cores with prime windings in various transmitter apertures, data registered within the cores may be shifted, re-circulated, or steered to provide either no output (storage), serial or parallel output or a precession of data through the register dependent upon either externally or internally control signals. Most importantly, the above data control is accomplished by a single circuit of few components which is common to all of the cores of a register and is automatically synchronized and reset by the basic register clock. By employing distinct priming circuits selectively energized through individual paths capable of being closed by triggers supplied from a common transformer having its primary linked to the advance drive of the register, considerable bit lengths can be driven and controlled by a single drive circuit. In addition to power and equipment savings, the automatic synchronization of the steering circuit permits a free running or dynamic internal or external transfer of considerable utility.

For a general description and definition of the material and energy requirements of multipath magnetic cores and windings of the type hereinafter referred to, reference may be had to the papers "MAD-Resistance Type Magnetic Shift Registers and Devices" by Dr. D. R. Bennion and Dr. David Nitzan, respectively, 1960 Proceedings—Special Technical Conference on Non-Linear Magnetic and Magnetic Amplifiers, Philadelphia, Pennsylvania, October 26–28, 1960, pages 96–133, published by the AIEE. In constructing a device in accordance with the invention, general reference may be had to U.S. Patent No. 2,995,731 to Joseph P. Sweeney, for a helpful and convenient wiring arrangement and lay-out of multipath magnetic core devices. Both the publications and the patent above mentioned will serve to more fully point out the terms of the art such as "advance," "prime," "hold" and the like.

In the drawings:

FIGURE 1 is a schematic block diagram of the system of the invention;

FIGURES 2–2C repersent intelligence flow diagrams of possible modes of operation of the invention;

Figure 1:
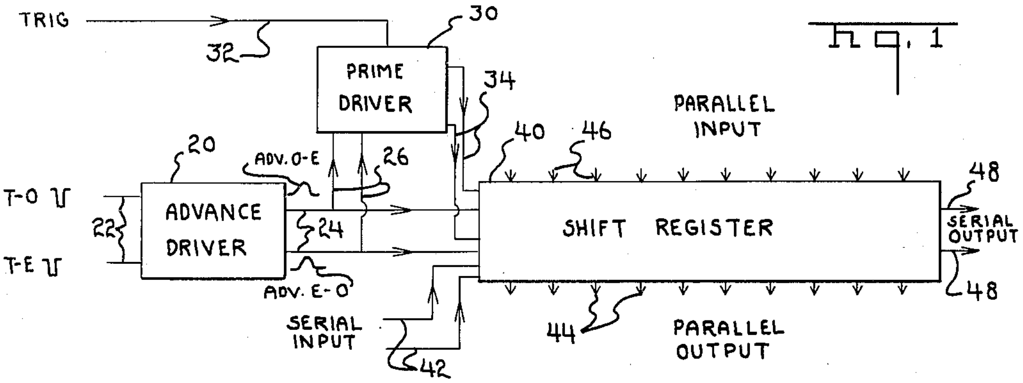

FIGURE 1 shows a block diagram of the system of the invention including an advance driver 20, a prime driver 30 and ten bit shift register 40. The driver 20 serves to supply the shift register 40 with advance pulses via leads 24 to effect a transfer of intelligence in the register. The driver 20 may comprise a pulse forming circuit capable of producing a positive pulse of critically damped sinusoidal shape on each of the leads 24 responsive to trigger inputs on leads 22. The triggers "T–O" and "T–E" may be supplied by a clock circuit capable of producing sharply defined negative pulses time spaced to produce a sequence of pulses ADVANCE "O" to "E," ADVANCE "E" to "O," ADVANCE "O"to "E," ADVANCE "E" to "O" from unit 20. The repetition rate of the trigger pulses serves to establish the rate of operation of the system which typically might be one, five, or ten kilocycles, or higher, depending upon the characteristics of the intelligence handled by the system. It is, of course, contemplated that the system might be driven at slower rates to include manually operated input of trigger pulses, intelligence and, in certain instances as will be shown, manual selection of the mode of operation.

The shift register 40 includes a register capacity of ten bits of intelligence which may be input or output serial-serial, serial-parallel, parallel-parallel or parallel-serial by means of input windings 42 and 46 and output windings 44 and 48. The input capability of the shift register 40 can, of course, be made to include less than that indicated, such as for example, serial input and parallel output, dependent upon the particular function required. It is also contemplated that the unit 40 may be extended to a register capacity of 40, 80, or 100 bits either in a single unit or in serially connected ten bit stages.

The prime driver 30 is, in essence, a steering circuit capable of controlling the shifting mode of the register 40 to accomplish one or several desired intelligence transfers. The unit 30, through leads 26, is synchronized with ADVANCE "O" to "E" and "E" to "O" pulses of unit 20 to provide appropriately timed priming pulses to unit 40. As will be more fully explained with reference to FIGURE 3, the unit 30 is adapted to remain in a particular state so as to effectively prime one and only one of the leads 34 and thereby control the shift of intelligence in registry in a given mode unless a triggering pulse is provided on lead 32. Upon application of a trigger pulse on lead 32 the unit 30 will function as a switch to interrupt the original path of conduction on one lead 34 and establish a path of conduction on the other lead 34 to thereby alter the priming circuit in unit 40 and change its mode of intelligence transfer.

In brief summary, the advance unit 20 supplies time displaced pulses which operate to drive or shift intelligence registered in unit 40 from core-to-core within the register, or, in certain instances, out of the register. The register 40 serves to retain, in temporary storage, intelligence bits in the form of magnetization states of the cores therein and includes input, output, and coupling windings linking individual cores to produce or respond to flux changes within the cores. The prime driver 30 serves to control the transfer of intelligence between selected cores of the register in a Normal mode of operation or in an Off-normal mode of operation dependent upon the presence of trigger pulses. By reason of a connection with unit 20 the prime driver is automatically clocked and reset with respect to register 40.

Figure 2:
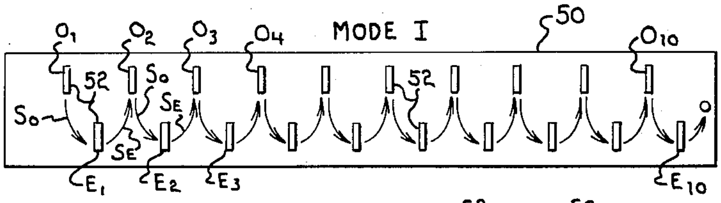
Figure 2A:
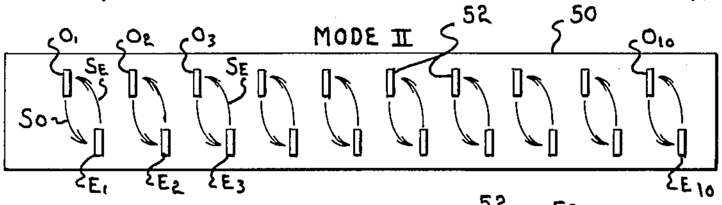
Figure 2B:
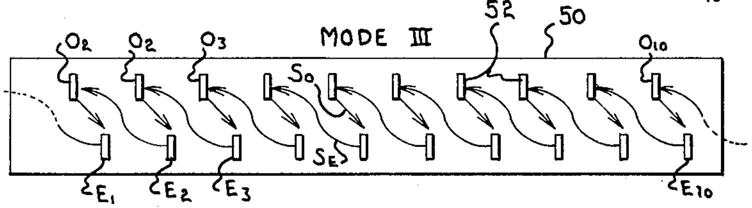
Figure 2C:
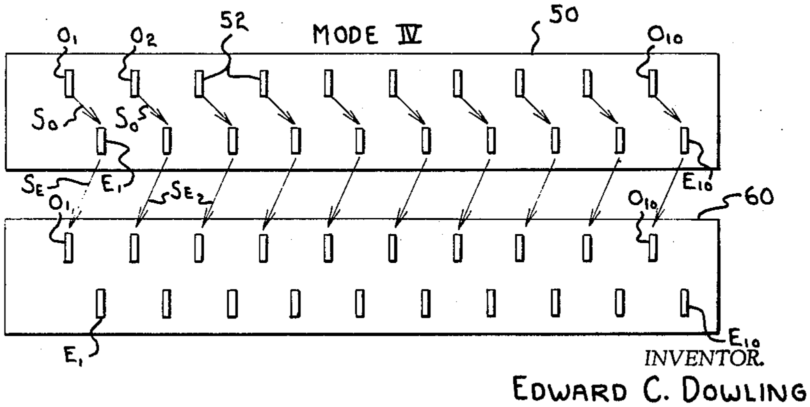

Referring now to FIGURES 2 through 2C, a description of examples of intelligence flow contemplated by the invention will be given. In each of the FIGURES 2–2C, the unit 50 represents a ten bit shift register including ten "odd" cores, $O_1$–$O_{10}$, and ten "even" cores, $E_1$–$E_{10}$, which may be arranged and mounted in accordance with the disclosure in U.S. Patent No. 2,995,731 to Joseph P. Sweeney. Each of the "O" and "E" cores 52 may be considered as multi-aperture magnetic cores capable of representing intelligence in the form of "one" and "zero" by a particular stable state of magnetization. The intelligence transfer depicted by the arrows $S_0$ in FIGURE 2 represents shift register operation wherein all cores $O_1$–$O_{10}$ are driven by ADVANCE "O" to "E" to cause a transfer of their intelligence state, be it "one" or "zero," to the corresponding cores $E_1$–$E_{10}$. On the next ADVANCE "E" to "O" drive pulse, the intelligence state of the "E" cores will be similarly transferred to the "O" cores in the manner indicated by the arrows $S_E$. In this manner, an intelligence bit will, after a number of cycles of ADVANCE "O" to "E" and ADVANCE "E" to "O," traverse the register $O_1$ to $E_1$, $E_1$ to $O_2$, $O_2$ to $E_2$ and so on, eventually being transmitted from the $E_{10}$ core out of the register. The intelligence transfer represented by FIGURE 2 will, for convenience, be hereinafter referred to as Mode I operation.

In FIGURE 2A, a different intelligence transfer is shown wherein intelligence bits are recirculated between the "O" and "E" cores on successive cycles of ADVANCE "O" to "E" and "E" to "O." As will be realized, the particular transfer of FIGURE 2A constitutes a type of dynamic storage in which the intelligence state of the register 50 remains the same with respect to external circuits which see the intelligence content of the register alternately appearing in the cores $O_1$–$O_{10}$ and $E_1$–$E_{10}$. In addition to accomplishing a novel dynamic storage, the transfer of FIGURE 2A lends itself to various types of logic and read-out not heretofore feasible. For example, any one or all of the cores $O_1$–$O_{10}$ or $E_1$–$E_{10}$ may be coupled by read-out windings and RF drive to provide a stataic read-out for monitoring or connecting purposes without either stopping or otherwise affecting the operation of the register. The transfer of FIGURE 2A shall be termed Mode II operation.

FIGURE 2B represents yet another example of intelligence transfer, termed Mode III, wherein the intelligence bits in registry are caused to precess through the register. Taking the bit stored in $O_3$, for example, successive applications of ADVANCE "O" to "E" and ADVANCE "E" to "O" will result in the bit being transferred to core $E_3$, then to $O_2$, then to $E_2$ and then to $O_1$. It will be recognized that Mode III operation is, in essence, a shifting of the intelligence in registry in the reverse sense to that of Mode I at the same rate but by a different route.

The manner of intelligence transfer shown in FIGURE 2C constitutes still another example termed Mode IV operation. The application of ADVANCE "O" to "E" causes a shift to the "E" cores of the register 50 and the next ADVANCE "E" to "O" results in a parallel destructive transfer of the intelligence of register 50 to the "O" cores of a register 60.

Referring again to FIGURE 1, the shift register 40 may be caused to operate in one of the foregoing modes, responsive to the operation of prime driver 30 in conjunction with individual prime windings threading different apertures of the "E" cores of the register. The system of FIGURE 1 includes a two mode capability; one of the leads 34 being energized for one mode of operation and the other lead being energized for an alternate mode. The selection of particular modes is made by the provision of coupling loops linking different "O" cores in conjunction with the individual prime windings above mentioned. As will become apparent from the description to follow, this feature provides a wide utility and logic capability with a simple and economical means of control.

Figure 3:
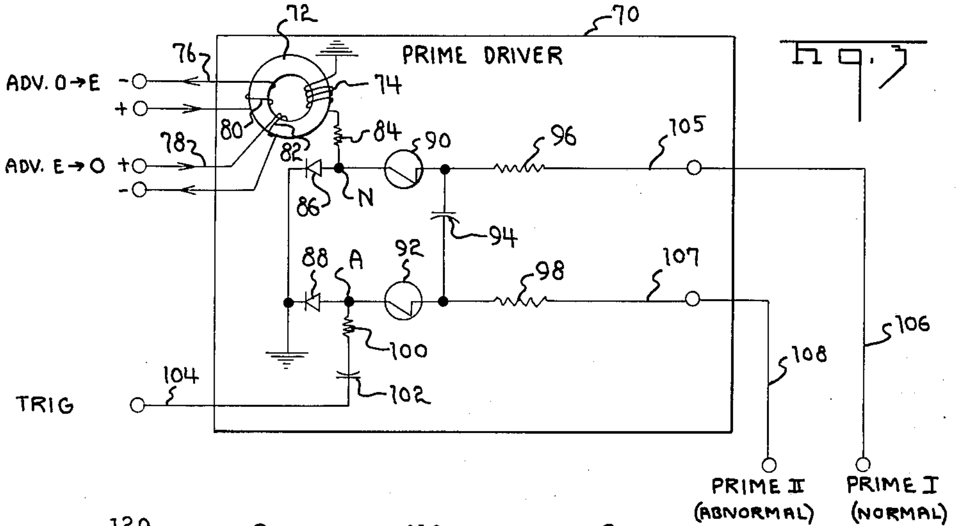
FIGURE 3 represents a schematic diagram of one embodiment of the prime driver of the invention.
Figure 4:
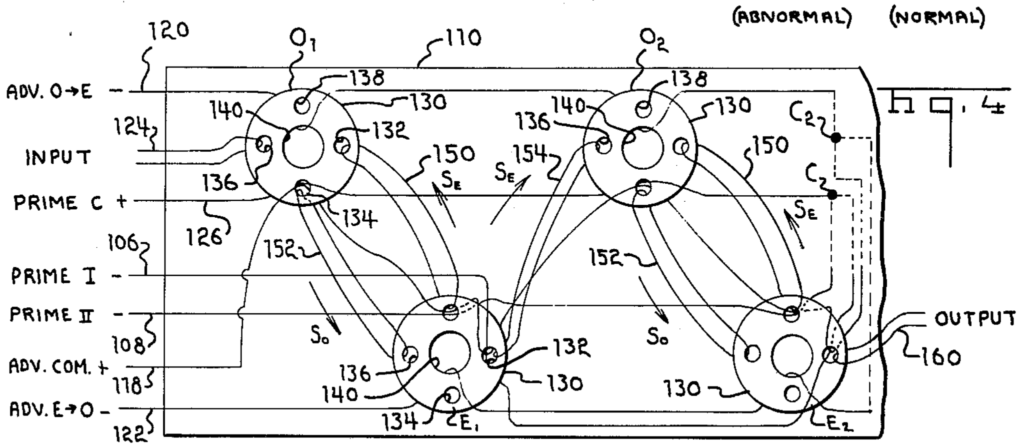
FIGURE 4 represents a schematic diagram showing an array of cores adapted to be driven by the circuit of FIGURE 3.
Figure 5:
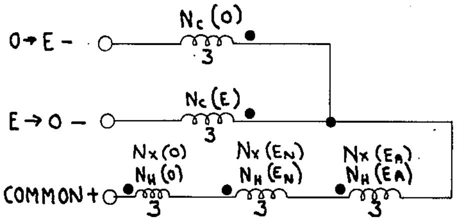
FIGURES 5–5B are schematic wiring diagrams for one set of "odd" and "even" cores wired in accordance with one embodiment of the invention.
Figure 5A:
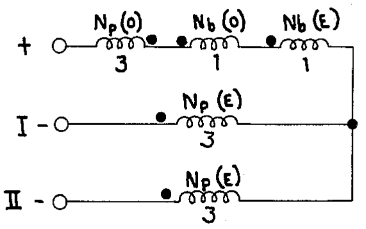

Referring now to the system of the invention in more detail, FIGURES 3–5 show circuit diagrams for a prime driver and register adapted for Mode I and Mode II operation, FIGURES 2 and 2A, respectively. The prime driver 70 constitutes a type of switch capable of maintaining a Normal path of conduction through one priming lead in response to advance pulses and further capable of responding to trigger pulses to switch to an Off-normal path of conduction through another priming lead. In the circuit of FIGURE 3, the output priming paths are represented by leads 106 and 108 which are selected to represent Prime I for Mode I and Prime II for Mode II operation. The external inputs to the unit 70 include an ADVANCE "O" to "E" winding 76, and ADVANCE "E" to "O" winding 78, and a trigger winding 104. The advance windings 76 and 78 are connected to the system advance driver so as to supply the unit 70 with advance pulses in phase with the advance pulses supplied to the register 110 and thereby automatically synchronize the unit 70 with the remainder of the system. The trigger for lead 104 may be supplied from a pulse source keyed by a drive trigger similar to "T–O" shown in FIGURE 1 or by ADVANCE "O" to "E." The internal circuit of unit 70 includes two identical and parallel paths connecting the priming paths 106 and 108 with the appropriate paths 105 and 107. Path 105 includes in series a resistor 96, a four-layer diode 90 and a blocking diode 86 connected to ground. The other path 107 includes resistor 98, a four-layer diode 92, blocking dode 88 and a connection to ground in common with the first path. The priming path 105 is selected as the Normal path and is adapted to be held conductive by the Normal operation of the circuit 70 through a trigger winding 74 linked to the advance pulses through a toroidal core 72.

Considering paths 105 and 107 and referring to FIGURE 4, the Prime Common lead 126, which is connected to a positive source, passes through each of the "O" cores of the register to a point C, which may be taken as the end of the register or the end of a series of cascaded registers. At point C, the prime winding 126 branches into the two windings 106 and 108 threading different minor apertures of the "E" cores and connecting paths 105 and 107 in unit 70 to complete the priming circuit. The Normal priming path may be considered as extending from Prime Common positive polarity, through winding 126 to winding 106, resistor 96, diode 90, blocking diode 86 to ground. It will be apparent that if the four-layer diode 90 is conducting a circuit will be completed resulting in the application of priming current to apertures 134 of the cores $O_1$ and $O_2$ and to apertures 132 of the cores $E_1$ and $E_2$. Assuming a given potential between Prime Common and ground, the rating of four-layer diode 90 may be selected so that current will not flow unless the potential at point "N" is substantially reduced (negatively) with respect to ground. The priming path 107 includes a similar arrangement with the rating of diode 92 being selected to block current flow except in the presence of a sufficient negative potential at point "A."

Normal or Mode I operation may be explained by considering the toroid 72 in its "cleared" state (clockwise flux circulation) and four-layer diode 90 in its non-conductive state. The application of ADVANCE "O" to "E" will operate to "set" (anti-clockwise flux circulation) the core 72 due to the senses of current flow and winding 80; the accompanying flux change inducing a current flow in winding 74 in the opposite sense through impedance matching resistor 84 and diode 86 to ground. The resultant conduction of diode 86 will produce a current flow of a polarity opposite to that required to cause diode 90 to conduct and the path 105 will remain at rest. The application of ADVANCE "E" to "O" of the above advance cycle will produce a current in winding 82 "clearing" toroid 72; the resulting flux change inducing a voltage driving point "N" negatively, back biasing diode 86 and causing diode 90 to conduct.

The priming path 105–106 will then be energized, priming the apertures 134 of core $O_1$ and $O_2$ and apertures 132 of cores $E_1$ and $E_2$. The next ADVANCE "O" to "E"–"E" to "O" pulses will not affect the conductive state of diode 90 and path 105 and the path 105–106 will continue to prime the "O" and "E" cores as above indicated.

In the event that Mode II operation is desired, the Off-normal priming path may be energized and the Normal path de-energized by the application of a trigger pulse on lead 104. Assuming that the ADVANCE "O" to "E" pulse is applied, toroid 72 is "set," and path 105 has been energized as above indicated, the immediate application of a trigger pulse through isolating capacitor 102, matching resistor 100 to point "A" will cause the four-layer diode 92 to conduct through the blocking diode 88 to ground, thereby causing current flow in the Off-normal path. This will drop the voltage across the diode 90 so that it is no longer conductive and will establish a priming path from Prime Common, lead 126, point $C_2$, winding 108, lead 107, resistor 98, diode 92, blocking diode 88 to ground. The next ADVANCE "E" to "O" pulse will switch toroid 72 thereby dropping the potential at point "N" to cause conduction of diode 90 which, in turn, will produce a voltage drop extinguishing diode 92 and restore the priming path to Normal. Application of the next cycle of advance current will, in the absence of a trigger input on lead 104, act to continue conduction of diode 90 and the energization of path 106 thereby holding the device in Mode I operation. The capacitor 94 inserted between the paths 105 and 107 operates to assure that diodes 90 and 92 can not maintain conduction simultaneously.

Referring now to FIGURE 4, there is shown a portion of a shift register sufficient to complete a description of operation relative to the prime driver 70. The unit 110 may be considered to have advance winding 118, 120 and 122, priming windings 106, 108 and 126, coupling windings 150, 152 and 154, and input and output windings 124 and 160. The advance windings 120 and 122 threading cores $O_1$–$O_2$, $E_1$–$E_2$, respectively, are driven from the same advance driver as windings 76 and 78 supplying unit 70. The advance winding 118 is connected to the negative portion of the advance circuit and serves to provide advance "hold" M.M.F. to each transmitter aperture of each "O" and "E" core from both advance pulses through a common connection at point $C_2$. The application of holding M.M.F. to each transmitter aperture serves to prevent the backward transfer of flux input via coupling loops by effectively holding the outer leg of core material in the "clear" state. As an example, when core $E_1$ is driven by ADVANCE "E" to "O," a holding M.M.F. is applied to aperture 134 of core $O_1$ which prevents core $O_1$ from receiving via coupling loop 152 thereby decoupling core $O_1$ with respect to core $E_1$ at aperture 134. The application of "hold" does not prevent a transfer via coupling loop 150 nor does it interfere with transfer from core $O_1$ during the ADVANCE "O" to "E" half cycle. The input winding 124 may be connected to an intelligence source, not shown, capable of producing pulses representative of "ones" and "zeros"; a "one" pulse being of a current sufficient to produce M.M.F. "setting" the core and the "zero" pulse being theoretically zero, but practically, at least of insufficient current to produce an M.M.F. overcoming the particular threshold necessary to "set" the core. The output winding 160 in FIGURE 4 would, in the usual ten bit register, represent the coupling winding to the $O_3$ core. In the abbreviated form shown in FIGURE 4, the winding 160 may be assumed to be connected to a suitable utility circuit capable of responding to the intelligence train shifted serially out of the register 110.

While not shown, parallel output windings could be linked through each O or E core either by separate windings linking an unused minor aperture or by winding linking the core major aperture. In a similar manner, parallel input windings can be linked to each core, care being exercised to establish the appropriate sense and number of turns to achieve a sufficient M.M.F. to "set" the core as hereinafter explained.

The cores 130 of the unit 110 are each comprised of ferrite magnetic material capable of being driven by applied M.M.F. into distinct states of magnetization representative of intelligence. These states are such that if the core is in a "zero" state the successive application of a priming current to a given minor aperture followed by a clearing current through an advance winding will induce in a coupling winding coupling the primed minor aperture a very slight current flow due only to elastic flux change and not to remanent flux change; whereas, if the core contains a "one" and is primed and cleared in the same manner, a relatively large current will be caused to flow in a coupling loop threading the primed minor aperture. Each of the cores 130 include minor apertures 132, 134, 136 and 138 and major aperture 140. As explained in the publications by Dr. Bennion and Dr. Nitzan, a core geometry including minor aperture permits defined paths of flux closure to exist which decouple one aperture from another and permit non-destructive readout.

The cores 130 of the unit 110 are arranged in parallel staggered columns, labeled for convenience "O" and "E". Between each successive core, such as $O_1$–$E_1$, $O_2$–$E_2$ there is included a coupling winding such as 152 and 150, respectively. The coupling windings 152 and 150 are adapted to transfer the intelligence state from cores $O_1$ and $O_2$ to cores $E_1$ and $E_2$ responsive to the flux change caused by the application of ADVANCE "O" to "E" current through winding 120. In similar fashion, cores $E_1$ and $E_2$ are coupled to succeeding "O" cores by windings such as 154 adapted to transfer intelligence responsive to ADVANCE "E" to "O" current coupled thereto by winding 122. The windings 150, 152 and 154 thereby accomplish intelligence routing for Mode I operation. As heretofore explained with reference to FIGURE 3, the Mode I prime circuit includes the prime winding 126 threading the apertures 134 of each "O" core and the apertures 132 of each "E" core. Thus, in Mode I operation, assuming that core $O_1$ is "set" to contain a "one," the successive application of ADVANCE "O" to "E" and "E" to "O" will result in a transfer of the "one" from $O_1$ to $E_1$ via coupling winding 152 followed by transfer of the "one" set into core $E_1$ to core $O_2$ via 154 and so on. During the application of ADVANCE "O" to "E," one and only one minor aperture of the O cores, in this case 134, is primed and therefore one and only one coupling loop, in this case 152, is linked by a path of flux closure capable of inducing a substantial current flow. During ADVANCE "E" to "O," of the E cores, only the aperture 132 is primed and therefore, intelligence transfer occurs through coupling windings 154. During Mode I operation, intelligence may be fed into core $O_1$ and then shifted from $O_1$ to $E_1$ to $O_2$ to $E_2$ throughout the register, and, if registers are cascaded, to the next register and eventually to a utility device.

If it is desired to initiate Mode II operation, the application of a trigger pulse on lead 104 in unit 70 of FIGURE 3 will, as heretofore described, interrupt the Prime I winding 106 conductive path and energize the Prime II path 108 thereby effectively priming apertures 138 of the "E" cores and the apertures 134 of the "O" cores. Again assuming a "one" state "set" into core $O_1$ followed by the application of ADVANCE "O" to "E" and a simultaneous trigger application to 104, FIGURE 3, the "one" will be transferred to core $E_1$ and then, since aperture 138 is primed, upon application of ADVANCE "E" to "O," the "one" will be transferred via coupling loop 150 to reset core $O_1$. In this manner, a bit may be recirculated from $O_1$ to $E_1$ to $O_1$ to $E_1$ as shown in FIGURE 2A by the repeated application of a trigger pulse to unit 70. Without the application of a trigger pulse, the unit 110 will automatically return to Mode I operation and shift the intelligence in the manner depicted in FIGURE 2.

Figure 5B:
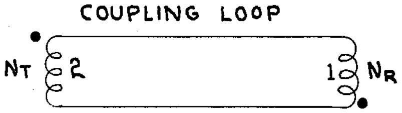

Referring now to FIGURES 5–5B there is shown advance, prime and coupling loop wiring diagrams applicable to each pair of "odd" and "even" cores, such as $O_1$ and $E_1$. These diagrams may be read by considering "N" as the number of turns applied in a sense indicated by the polarity adjacent each branch in conjunction with the dot to the right or left of each winding. The subscript symbology employed is as follows:

C—Advance winding, major aperture, transmitting core;
H—Holding winding, minor aperture, receiving core;
X—Advance winding, minor aperture, transmitting core;
P—Prime winding, minor aperture, transmitting core;
B—Prime winding, major aperture;
N—Normal transmitting minor aperture;
A—Abnormal transmitting minor aperture;
T—Transmitter aperture;
R—Receiver aperture.

The parenthesized notations include "O" for odd cores and "E" for even cores of a given "odd" and "even" core set. The term $$\underset{\substack{\sim\\3}}{N_c}(O)$$

for example, includes three turns of advance windings through the major aperture of an "O" core. Utilizing the above wiring diagram, numerous other modes may be obtained from the basic O–E core arrangement above given by applying analogous windings and maintaining the energy relationships as taught.

Figure 6:
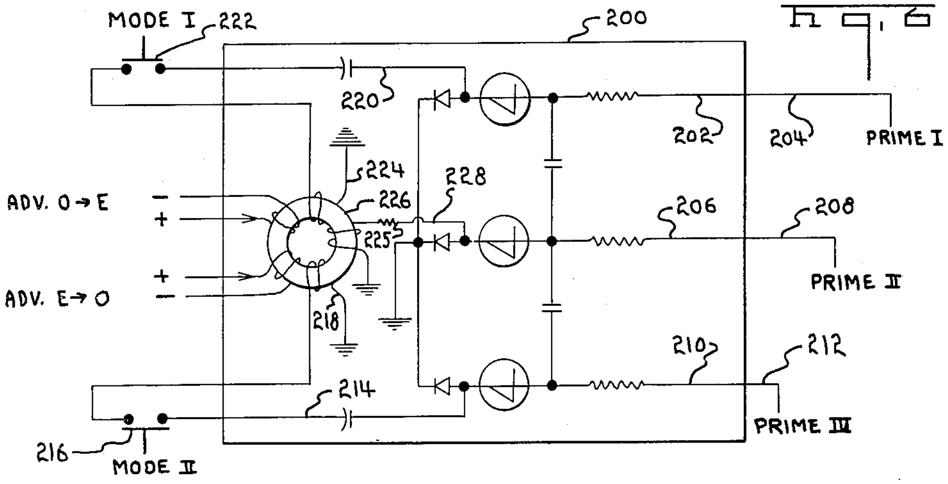
FIGURE 6 is a schematic diagram of a further embodiment showing a different prime driver circuit.
Figures 7, 9:
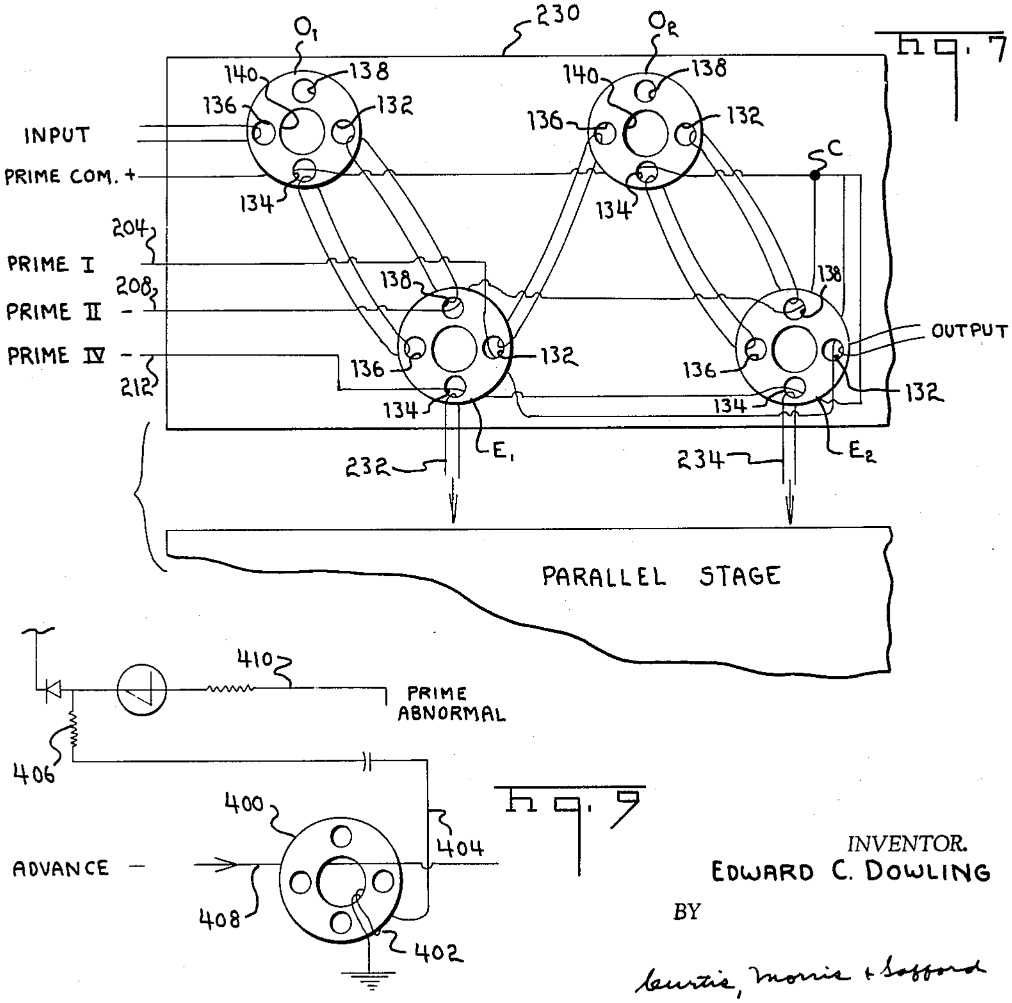
FIGURE 7 is a schematic diagram showing an array of cores adapted to be driven by the circuit of FIGURE 6.
FIGURE 9 represents a partial circuit diagram showing one type of system input.

FIGURES 6 and 7 depict an embodiment of the system of the invention adapted for three modes of operation. The prime driver 200 includes three paths 202, 206 and 210 supplying priming leads 204, 208 and 212, respectively, which are adapted to prime the "E" cores of unit 230 of Mode I, Mode II or Mode IV operation. In this embodiment, the Normal priming path 206 is selected to prime in Mode II, as shown in FIGURE 2A; the paths 204 and 212 being Off-normal paths adapted to prime for intelligence transfer as shown in FIGURES 2 and 2C, respectively. The three paths of unit 200 include components similar to the paths described with respect to FIGURE 3; namely, a resistance, a four-layer diode and a blocking diode, serially connected from the shift register prime paths to ground within the unit 200. The normal path 206 includes a connection via lead 228 to the toroid 226 via a winding capable of producing a current flow and voltage drop during each ADVANCE "E" to "O" cycle in a manner to cause the diode of the path 206 to conduct.

Each of the other paths 202 and 210 include triggering circuit similar to the one heretofore described with reference to FIGURE 3 but include a switch which may be manually operated to effect a selected mode of operation. As shown in FIGURE 6, each of the Off-normal trigger paths include a winding about the toroid 226 in a sense to respond to ADVANCE "O" to "E" flux changes causing a current flow through isolating resistor 225 backbiasing the respective blocking diode and causing the respective four-layer diode to conduct. Taking the Mode I circuit 202 as an example, it will be apparent that the trigger circuit 220 will be unaffected by flux changes in winding 224 with switch 222 open. With switch 222 closed, ADVANCE "O" to "E" will "set" core 226 causing a flux change inducing a current flow for which there is no available path through the blocking diode of path 202 thus generating a potential drop causing path 202 to become energized thereby priming path 204. ADVANCE "E" to "O" will induce a current flow in the trigger circuit 220 in an opposite direction which is shorted by the blocking diode of path 202, thus not affecting path 204. In a similar manner, Mode IV operation can be obtained by operation of the switch 216 through winding 218 and path 214. It will be apparent that as long as either of the switches 216 and 222 are held closed, the respective mode of operation, Mode I or Mode IV, will be maintained during the ADVANCE "O" to "E" half cycle and return to Normal on each ADVANCE "E" to "O" half cycle, again returning to Off-normal or ADVANCE "O" to "E." Upon opening the circuits 216 or 220, unit 200 will automatically return to Normal operation priming lead 208, and remain during all advance cycles.

The unit 230 may be considered as wound with advance windings in the manner described with respect to FIGURE 4, the only change being that the advance common winding 118 providing $N_H$ shown in FIGURE 4 would also thread the aperture 134 of each "E" core in the manner shown with respect to apertures 132 and 138. The application of priming current on lead 208 will prime the apertures 138 of the "E" cores as well as the apertures 134 of the "O" cores so that successive applications of ADVANCE "O" to "E" and ADVANCE "E" to "O" will result in an intelligence transfer as shown in FIGURE 2A. Closure of one of the switches for the Off-normal paths, such as switch 222, will cause a cessation of priming current on lead 208, and following ADVANCE "O" to "E" cause the path 204 to apply priming current to the apertures 132. As in the foregoing manner, the intelligence transfer will now be Mode I as shown in FIGURE 2. Opening the switch 222 will result in the next ADVANCE "E" to "O" pulse re-establishing conduction in path 206 thereby priming the apertures 138 of the "E" cores and returning the intelligence transfer to Mode II operation.

In the same manner, closure of switch 216 will result in priming the apertures 134 of the "E" cores thereby transferring the intelligence states of all "E" cores of the unit 230 to an adjacent unit, via the coupling loops 232 and 234, which may be considered as threading minor apertures of "O" cores in the adjacent unit. This latter operation representing Mode IV, FIGURE 2C, is, in effect, dynamic parallel read-out.

The circuit of FIGURES 6 and 7 may be adapted to high speed operation by replacing the switches 216 and 222 with solid state devices capable of being closed by keying pulses associated with the particular intelligence train supplied to the register; or, as will be hereinafter described, trigger pulses may be derived as dynamic voltage outputs from some external or internal magnetic core during ADVANCE "O" to "E."

Figure 8:
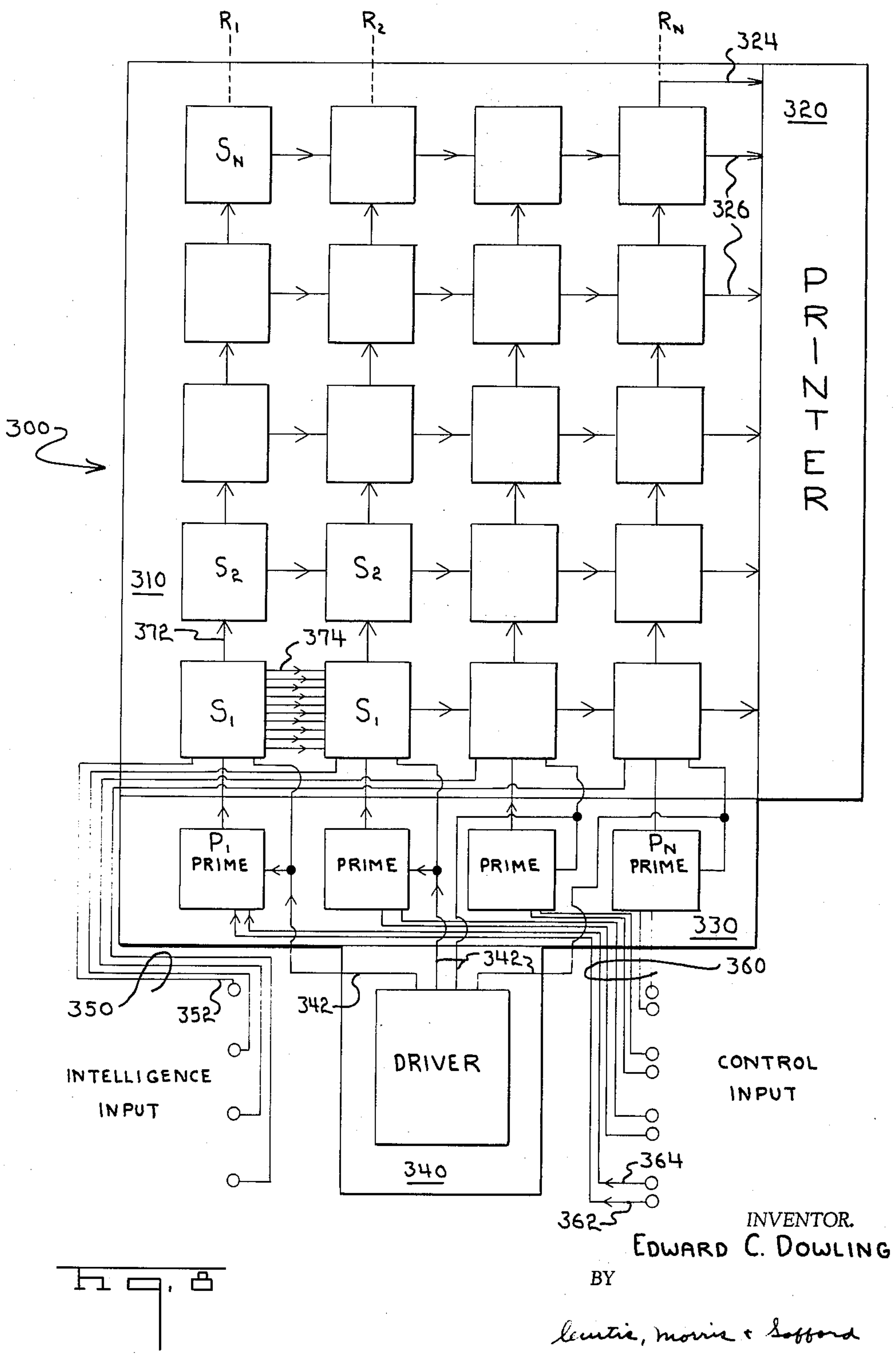
FIGURE 8 is a block diagram of a logic system included to exemplify the use of the invention.

Referring now to FIGURE 8, there is shown a schematic diagram of a logic system of the type which may be constructed by use of the preesnt invention. The components of the system 300 include an intelligence storage and transfer bank 310, a prime steering supply 330, a common advance drive supply 340 and a printer or utility device 320.

The unit 310 may be considered as comprised of rows $R_1$–$R_n$, containing shift registers $S_1$–$S_n$ interconnected for intra-row serial transfer and inter-row parallel transfer as is shown with respect to registers $S_1$, $S_2$ of row $R_1$ and $S_1$ of row $R_2$. Each of the registers may be further considered as internally wired for Normal and Off-normal operation in the manner heretofore described. Associated with each unit 310 is a prime steering supply 330 including prime steering units $P_1$–$P_n$, individual to each row of registers in unit 310. Common to the units 310 and 330 is an advance driver 340 which may be considered as supplying synchronized ADVANCE "O" to "E" and "E" to "O" pulses via separate leads, such as 342, in the manner described with respect to the circuit of FIGURE 1. A printer or other suitable utility device may be directly connected to unit 310; the only operational requirement being that the unit 320 must be capable of receiving and utilizing the register signal output in the signal form employed. External to the system 300 are two sets of leads 350 and 360 for information or intelligence input and control respectively. Independent of wiring changes within the unit 310, the system 300 may be caused to operate in a wide variety of system modes. By providing different wiring schemes in the manner above discussed with respect to FIGURES 4 and 7 the system 300 can be adapted to accommodate a much broader logic and memory system capability. With the foregoing in mind, several examples of uses for system 300 will be described.

Consider each of the registers $S_2$–$S_{10}$ of each row of $R_1$–$R_n$ as having a ten bit capability and as having prime windings in accordance with the embodiment of FIGURE 7. Consider further that each prime unit $P_1$–$P_n$ comprises a circuit as shown in FIGURE 6 and therefore is capable of being controlled to operate in either of the Modes I, II or IV as shown in FIGURES 2, 2A and 2c; the Normal mode being Mode II. By closing one of the control input paths such as 364, a prime unit such as $P_1$ may be operated to drive each of the registers $S_1$–$S_n$ in row $R_1$ into Mode I operation. Intelligence in the form of trains of pulses representative of "ones" and "zeros" may then be fed into unit 310 via an intelligence input such as 352. Since the row of registers $R_1$ is in Mode I, the train of intelligence bits will be serially shifted through register $S_1$ via lead 372 to register $S_2$ and eventually to register $S_n$. Upon command and at any desired time, as for example, during a pause between information trains, the registers in row $R_1$ may be driven into Mode II or Normal operation by removing the control input from lead 364. In the same manner the intelligence in registry in row $R_1$ may be dumped in a parallel transfer via leads such as 374 into the associated registers of row $R_2$ through the operation of unit $P_1$ in Mode IV. This latter function being accomplished through the application of a control input via lead 362 for one-half cycle; i.e. during an ADVANCE "E" to "O" drive pulse. In this manner intelligence trains of considerable bit length may be fed into the unit 310 serially and upon command transferred in parallel from row to row of the unit eventually being dumped into the printer 320 via leads 326 or lead 324. As an alternate possible operation of system 300, separate intelligence trains might be fed into the leads 350 and simultaneously stored within each row associated therewith. At any rate, the entire bit content of the unit 310 can be dumped in parallel by the application of eight advance cycles with each row $R_1$–$R_n$ being held in the Mode IV operation. In the foregoing types of transfer, information in the form of trains of pulses may be handled on a synchronous or asynchronous basis. For example, the intelligence inputs 350 may each represent some phenomena being measured by each of four instruments operating at the same time. Alternatively, one of the inputs 350 may be used to accommodate intelligence representative of measurements made by four instruments on a sequential basis wherein the information representative of each instrument would be fed into row $R_1$ and transferred to row $R_2$. The information of the next instrument then being fed into row $R_1$. The foregoing technique could, of course, be used to accommodate single or multichannel computer signal trains in the same manner.

By providing signal lamps associated with each core of each register and including a separate drive circuit operable to energize a given lamp responsive to the intelligence state of the core, the system 300 may be adapted to a wide variety of additional uses wherein the visual position of a bit or bits can be used to represent a quantitative or qualitative analysis of data in registry.

In the foregoing examples, each prime controlled mode has been achieved by means of an externally developed trigger input. As an alternative embodiment, it is contemplated that various Off-normal mode inputs can be developed from the bit content of the register so that the information within processing may control its own routing and destination. Referring to FIGURE 9, core 400 may represent any core of a register and path 410 may represent an Off-normal priming path of a prime steering device similar to path 107 in FIGURE 3. Threading core 400 is a winding 402 connected via lead 404 and matching resistor 406 to path 410. The winding 402 includes a number of turns sufficient to produce a voltage drop causing the four-layer diode of path 410 to conduct when the core 400 is in its "set" state and is cleared by an advance pulse on winding 408. Clearing of core 400 when in the "zero" state will not produce a sufficient flux change to induce a voltage causing path 410 to be energized. In this manner, any register core may be utilized to drive the prime steering unit into a desired Off-normal mode responsive to the intelligence state of the core. As an example, consider the circuit of FIGURE 8 with core 400 being the last "O" core of register $S_n$ in each row and lead 404 connecting the control inputs 362. With this arrangement, the presence of a "one" in the last "O" core will, upon ADVANCE "O" to "E," drive the associated prime unit into Mode IV operation, thereby effecting a parallel transfer into an adjacent row. It will be appreciated that by providing a similar circuit, any other core may be used to cause a change of mode responsive to the presence of a "one" being transferred from the core. Following the Off-normal mode, the next ADVANCE "E" to "O" pulse will return the circuit to the Normal mode of operation. Successive "ones" appearing at the last "O" core will result in successive parallel transfers followed by a return to the Normal mode in the same manner as above described with respect to the application of external trigger inputs. Combinations of both internally and externally generated triggers may be employed to accomplish a wide variety of logic functions.

In the preceding description exemplifying preferred modes of the invention, circuits are shown employing five aperture intelligence cores interwound to perform two or three distinct inter core intelligence transfer. It is contemplated that cores having more or less apertures can be employed by abbreviating or extending the wiring techniques disclosed in conjunction with complementary changes in the priming circuits. It is further contemplated that the transfer decision could be made prior to ADVANCE "E" to "O" and the actual transfer could be made from the "O" cores rather than from the "E" cores if desired. In this manner, parallel transfer from right to left could be accomplished. As an additional feature, it is contemplated that the intelligence in registry in any given row such as row $R_1$ may be transferred serially to the adjacent row such as $R_2$ by the provision of conductor linking the output of register $S_n$ to the register $S_1$ of the adjacent row.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. An intelligence transfer system including in combination a register comprised of magnetic cores coupled by at least input and output windings adapted to transfer intelligence into and out of the register and by transfer windings forming distinct paths of intelligence transfer within the register; advance means including advance windings coupling the cores of the register with phased advance pulses and prime means including windings coupling the cores of the register in distinct priming paths related to the said transfer paths; the priming means further including a control circuit having a plurality of paths each selectively energizable to prime one of the priming paths to effect a transfer of intelligence in a selected mode of intelligence transfer, with said circuit being energizable responsive to advance pulse energy.

2. The system of claim 1 wherein the plurality of paths of the control circuit include a first path energizable responsive to one phase of advance pulses and another path energizable responsive to another phase of advance pulses.

3. The system of claim 1 wherein the plurality of paths of the said control circuit include a first path energizable responsive to one phase of advance pulses and another path energizable responsive to an externally generated signal.

4. The system of claim 1 wherein the plurality of paths of the said control circuit include a first path energizable responsive to one phase of advance pulses and another path energizable responsive to a signal generated by output windings linking at least one core of the register.

5. The system of claim 1 wherein the control circuit paths are interconnected to provide a voltage drop sufficient to deenergize a given path responsive to the energization of any other path.

6. The system of claim 1 wherein the said prime means includes an additional winding coupling the cores of the register in a distinct path related to an intelligence transfer out of the register via said output windings.

7. In magnetic core device including multi-aperture magnetic cores driven to transfer intelligence by the coincident application of advance M.M.F. to major core apertures and prime M.M.F. to particular minor apertures, a prime steering unit for selectively energizing one of plurality of priming paths linking the core minor apertures including a first path and at least a second path each having a voltage sensitive solid state device adapted to be driven to conduct by the application of control signals; means including a magnetic control core for supplying a first control signal, said means being responsive to one phase of advance pulses linking the said core to develop an M.M.F. to prime the said first path.

8. The combination as in claim 7 including an additional circuit linking the said control core for supplying a second control signal responsive to another phase of advance pulses linking the said control core to energize the said second path.

9. The combination as in claim 7 including additional means for supplying additional control signals responsive to flux changes in other magnetic cores representative of intelligence transfer.

10. A logic system employing multipath magnetic cores capable of assuming stable states of magnetization representative of intelligence including a plurality of magnetic cores intercoupled by transfer windings defining distinct patterns of intelligence transfer; advance means linking each core with phased advace pulses; priming means linking each core in different paths each defining a distinct mode of intelligence transfer related to one of said transfer winding patterns; further means for energizing one of said priming paths, said further means being responsive to advance pulses to establish one mode of intelligence transfer and other means for energizing another of said priming paths to establish another mode of intelligence transfer.

11. A logic system employing multipath magnetic cores capable of assuming distinct stable states of magnetization representative of intelligence including a plurality of magnetic cores intercoupled by transfer windings defining distinct patterns of intelligence transfer; advance means linking each core with phased advance pulses; priming means linking each core in different paths each defining a distinct mode of intelligence transfer related to one of said transfer winding patterns; further means for energizing one priming path, said further means being responsive to advance signals to establish one mode of transfer and other means for energization other priming paths responsive to control signals to establish other modes of intelligence transfer.

12. An intelligence transfer system including O and E magnetic cores capable of a plurality of stable states of magnetization representative of intelligence, each O core including transmitting and receiving apertures, each E core including a receiving aperture and a plurality of transmitting apertures, first winding means coupling a transmitting aperture of each O core to a receiving aperture of each E core and second winding means coupling at least two transmitting apertures of each E core to different O cores; advance means linking each O core and each E core with phased advance pulses; priming means for priming the transmitting apertures of each core including a first path linking the transmitting apertures of the O cores and the other paths linking different transmitting apertures of the E cores; the priming means being synchronized with the advance means by an interconnection therewith to energize the first priming path and one of the other priming paths to establish one mode of intelligence transfer; the priming means including control means capable of energizing the said first path and another of the other priming paths to control intelligence transfer in a different mode.

13. The combination of claim 12 wherein the advance means includes a first advance winding linking the O cores and a second advance winding linking the E cores, the first and second advance windings being interconnected to the third winding linking the transmitting apertures of each core in a sense to apply a holding M.M.F. thereto during each advance pulse to effectively block inputs from receiving apertures to transmitting apertures.

14. The combination of claim 12 wherein the said first priming path is commoned to the said other priming paths.

References Cited by the Examiner

UNITED STATES PATENTS

| | | | |
|---|---|---|---|
| 2,968,795 | 1/61 | Briggs et al. | 340—174 |
| 2,993,197 | 7/61 | Broadbent | 340—174 |
| 3,007,056 | 10/61 | Loguet et al. | 340—174 X |
| 3,023,401 | 2/62 | Loev | 340—174 |
| 3,138,788 | 6/64 | Nitzan et al. | 340—174 |

IRVING L. SRAGOW, *Primary Examiner.*